Figure 1:
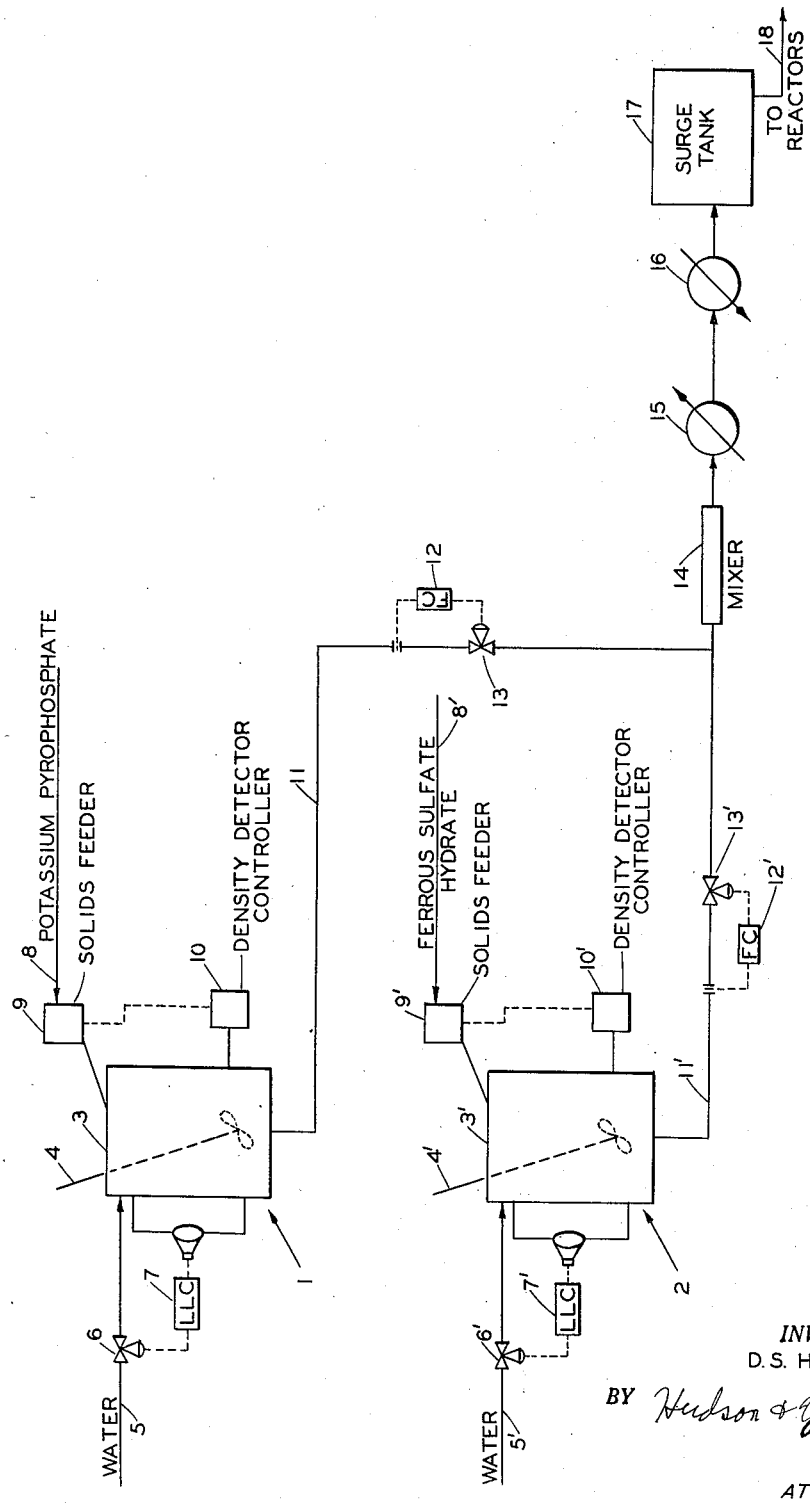

Feb. 4, 1958   D. S. HARMONY   2,822,248
CONTINUOUS PRODUCTION OF SALT SOLUTIONS
Filed Dec. 27, 1954   2 Sheets-Sheet 2

○ FERROUS SULFATE ($FeSO_4 \cdot 7H_2O$) CONC. VS. SP. GR.
□ TETRAPOTASSIUM PYROPHOSPHATE ($K_4P_2O_7$) CONC. VS. SP. GR.
● $FeSO_4 \cdot 7H_2O$ LBS./GAL. VS. SP. GR.
■ $K_4P_2O_7$ LBS./GAL. VS. SP. GR.

*INVENTOR.*
D. S. HARMONY
BY *Hudson & Young*
ATTORNEY

United States Patent Office 2,822,248
Patented Feb. 4, 1958

2,822,248

CONTINUOUS PRODUCTION OF SALT SOLUTIONS

David S. Harmony, Bartlesville, Okla., assignor to Phillips Petroleum Company, a corporation of Delaware Application December 27, 1954, Serial No. 477,757

7 Claims. (Cl. 23—312)

This invention relates to preparation of aqueous solution. In one of its aspects it relates to the preparation of a complex pyrophosphate solution. In a more specific aspect, this invention relates to the preparation of a pyrophosphate complex from ferrous sulfate and ammonium or alkali metal pyrophosphate for use as activator in an emulsion polymerization system.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures in emulsion polymerization recipes. Since conversion rates generally decrease rapidly as the temperature decreases, faster recipes are necessary in order that these reactions may be carried out in a reasonable time. Among the recipes developed are those known as redox recipes which employ an oxidant, an activator and in some systems a reductant. The oxidant is a peroxide or hydroperoxide. The activator is generally selected from the group of materials consisting of compounds of metals such as iron, manganese, copper, vanadium, cobalt, etc. In general it is assumed that the metal must be a multivalent metal and in such a condition that it can change its valence state reversibly. In such recipes where a reductant is used, it is usually an organic material such as a reducing sugar or other easily oxidizable polyhydroxy compounds such as glucose, levulose, sorbose, invert sugar and the like. As the oxidant in such a recipe there can be used an inorganic peroxide, such as hydrogen peroxide; a pernitrate, a persulfate, a permanganate, or the like; an organic peroxide such as benzoyl peroxide; or an organic hydroperoxide such as tertiary butyl hydroperoxide, methyl cyclohexyl hydroperoxide, or cumene hydroperoxide. It is usually desirable to include in such recipes an emulsifying agent and a polymer modifier. Emulsifying agents employed include alkali metal alkyl aryl sulfonates, sulfates of long-chain aliphatic alcohols, water soluble acid salts of organic bases containing a hydrocarbon chain of 8 to 24 carbon atoms, quaternary ammonium salts, alkali metal and ammonium salts of fatty acids, alkali metal and ammonium salts of rosin acids, and non ionic emulsifying agents. The modifying agent most generally used are sulfur containing compounds such as mercaptans, organic sulfides, thio and di-thionic acids and salts, xanthogenic acids and salts, thiocarbonic acids and salts and the like. However, the aryl and alkyl mercaptans are most generally used, with the tertiary $C_{12}$ to $C_{16}$ mercaptans being of particular importance.

The foregoing discussion of ingredients used in an emulsion polymerization redox system in addition to the monomers and aqueous medium is not intended to be exhaustive but is illustrative of the type of polymerization system in which the catalyst as prepared by the method of this invention is useful. It is within the skill of the art to select the particular ingredients and polymerization conditions for the desired results.

The activator solution is a very important part of the recipe and certain improvements in its preparation result in markedly increasing the rate of polymerization and frequently also favorably influence the characteristics of the reaction mixture. Usually this oxidation catalyst or activator comprises a compound of a multivalent metal such as iron, manganese, copper, vanadium, cobalt, and the like. The multivalent metal ion of such compounds can readily pass from a low valence state to a higher valence state, and vice versa. Sometimes the compound, when present in its lower valence state, can function in the dual role of reductant and activator. The metal salt is frequently used as a complex with ammonium or alkali metal pyrophosphate. Such a polymerization system is known as a "pyrophosphate-activator" system. Such a system does not require a separate reductant, however, such a separate reductant is not excluded.

One commonly used catalyst is iron pyrophosphate. In a pyrophosphate-activator system comprising hydrogen peroxide and organic mercaptan, ferrous pyrophosphate, prepared by addition of a ferrous salt to an aqueous solution of sodium or potassium pyrophosphate, has been found to be a useful activator. However, the ferric salt can be used and may be preferred in some redox systems. In antifreeze systems (i. e. those polymerizations carried out at such temperatures wherein an antifreeze is required to prevent freezing of the aqueous medium) the sodium pyrophosphate is generally preferred, while the potassium pyrophosphate is frequently preferred at the higher temperature. As has been indicated, the pyrophosphate-activator system is particularly advantageous in low temperature system such as the well known 14° F. and 41° F. emulsion polymerization systems. However, such pyrophosphate-activator systems can be used in recipes employing a temperature in the range of —40° to +160° F.

When carrying out a polymerization with the ferrous system, certain difficulties are encountered. For example, if the catalyst is prepared in the form of a so-called "activator" solution by adding ferrous sulfate to an aqueous solution of sodium pyrophosphate, the solution must be used immediately, otherwise oxidation by the atmosphere destroys its potency. Also ferrous sulfate is generally purchased as $FeSO_4 \cdot 7H_2O$. This material loses its water of hydration readily and the composition will vary even in one lot of purchased material. When the activator is prepared by adding the ferrous sulfate as solids, the actual amount of ferrous sulfate used will vary depending upon the amount of water present. Now, if the concentration of ferrous ion added to the system is greater than the concentration of the cumene hydroperoxide, i. e. if there is present more than one gram, or milligram mol ferrous ion per gram or milligram mol of cumene hydroperoxide, polymerization is retarded. The excess of cumene hydroperoxide required for optimum operating conditions over the mol ratio of one to one is critical so that slight errors in measurements of these ingredients can easily cause great differences in the rate of polymerization. The ratio of ferric ion to oxidant is not so critical but the ferric complexes do not give the high polymerization rates obtainable with properly prepared ferrous pyrophosphate complexes.

In preparing activator solutions, a ferrous or ferric salt is added to a solution of ammonium or alkali metal pyrophosphate. Ferrous or ferric pyrophosphate is formed by metathesis and these compounds combine further to form pyrophosphate complexes. For this reason, it has become customary to speak of ferrous pyrophosphate and ferric pyrophosphate activators without specifying the source of the ferrous or ferric ions, that is, whether derived from the sulfate or some other salt, and without specifying to what extent the resulting pyrophosphate has been complexed.

While this invention is particularly useful in the preparation of ferrous pyrophosphate complexes, it can also be used for preparing other metal pyrophosphate complexes and particularly ferric pyrophosphate. Such other metals which are useful are the multivalent metals as have been mentioned as water soluble salts.

An object of this invention is to provide a method and apparatus for preparing a pyrophosphate complex of uniform quality.

Another object of this invention is to provide a method of preparing an aqueous solution of uniform concentration from solid materials of varying quality.

Still another object of this invention is to provide an improved method of preparing a ferrous pyrophosphate complex activator solution for use in emulsion polymerization.

Other objects and advantages of this invention will be apparent from the following description when taken in conjunction with the attached drawing which is a diagrammatic block diagram of a preferred embodiment of this invention.

I have found that the quality of the activator solution can be maintained at a uniform level by preparing solution of the metal salt and solution of the alkali pyrophosphate of uniform density and mixing the two solutions at a uniform rate. In the practice of this invention, I prepare an aqueous solution of alkali pyrophosphate in a first preparation zone to a predetermined density and an aqueous solution of metal salt in a second preparation zone to a second predetermined density. I withdraw solution from each zone at a predetermined rate and mix the two solutions, the mixed solution is passed to a heating zone wherein the two salts form the pyrophosphate complex after which the resulting solution is cooled to the polymerization temperature. As the solution is being removed from each zone, the volume in said zone is maintained by detecting liquid level changes and admitting water in response to said changes. At the same time the density of the solution is being detected and fresh salt is added to the preparation zone respondent to changes in the density. By such a procedure, the solution concentration in each preparation zone is maintained constant even though the composition of the salt changes. By mixing constant density solutions at a constant rate, the concentration of the resulting solution is accurately controlled. Also the activator solution is prepared as it is used and the activator quality is maintained at a constant level.

The activator solution or pyrophosphate complex can be prepared by admixing a solution of the multivalent metal salt with a solution of ammonium or alkali-metal pyrophosphate and heating the mixture. A reaction occurs between the salts. When preparing the activator the mixture is generally heated above 50° C. for variable periods depending upon the temperature. For example, if the mixture is boiled, a period of twenty minutes or less is sufficient to produce the desired activity, and the time of boiling may be as low as 30 seconds. In general, a temperature is used to insure the desired activity when the solution is heated for a time dependent upon the resident time in the heating zone.

The amounts of activator ingredients are usually expressed in terms of the monomers charged. The multivalent metal should be within the range of about 0.01 to 10 millimols per 100 parts by weight of monomers, with 0.1 to 2.5 millimol being generally preferred. The amount of pyrophosphate should also be within the range of about 0.01 to 10 millimols based on 100 parts by weight of monomers; however, the narrower range of 0.1 to 2.5 millimols is more frequently preferred.

Monomeric materials which can be polymerized in an aqueous emulsion in pyrophosphate activator systems comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated dienes such as 1,3-butadiene, 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alphamethyl styrene, vinylnaphthalene and similar derivatives thereof, and the like; heterocyclic nitrogen containing monomers such as 2-vinylpyridine, 2,5-divinylpyridine, 2-methyl-5-vinylpyridine, 2-vinyl-5-ethylpyridine, 3,4,5,6 - tetramethyl - 2 - vinylpyridine, 2-isopropyl - 4 - nonyl - 5 - vinylpyridine, 3,5-di(alpha-methylvinyl)pyridine, 2 - vinylquinoline, 4 - hexyl - 5-vinylquinoline, 2-vinylisoquinoline, 5 - methyl - 1 - isopropenylisoquinoline and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethynyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds can be polymerized alone, or mixtures of two or more of such compounds which are copolymerizable with each other in aqueous emulsion can be copolymerized in pyrophosphate activator systems.

As has been said, my invention relates to the preparation of the activator solution and is not limited to any particular polymerization recipe, it being within the art to select the desired polymerization recipe. As has been indicated, the method and apparatus of this invention has a particular advantage in the preparation of the ferrous pyrophosphate complex and for that reason I will illustrate this invention by referring to the preparation of that particular activator. However, I am not limited to such particular activator since my invention is useful in the preparation of multivalent metal-pyrophosphate complexes generally.

Figure 2:
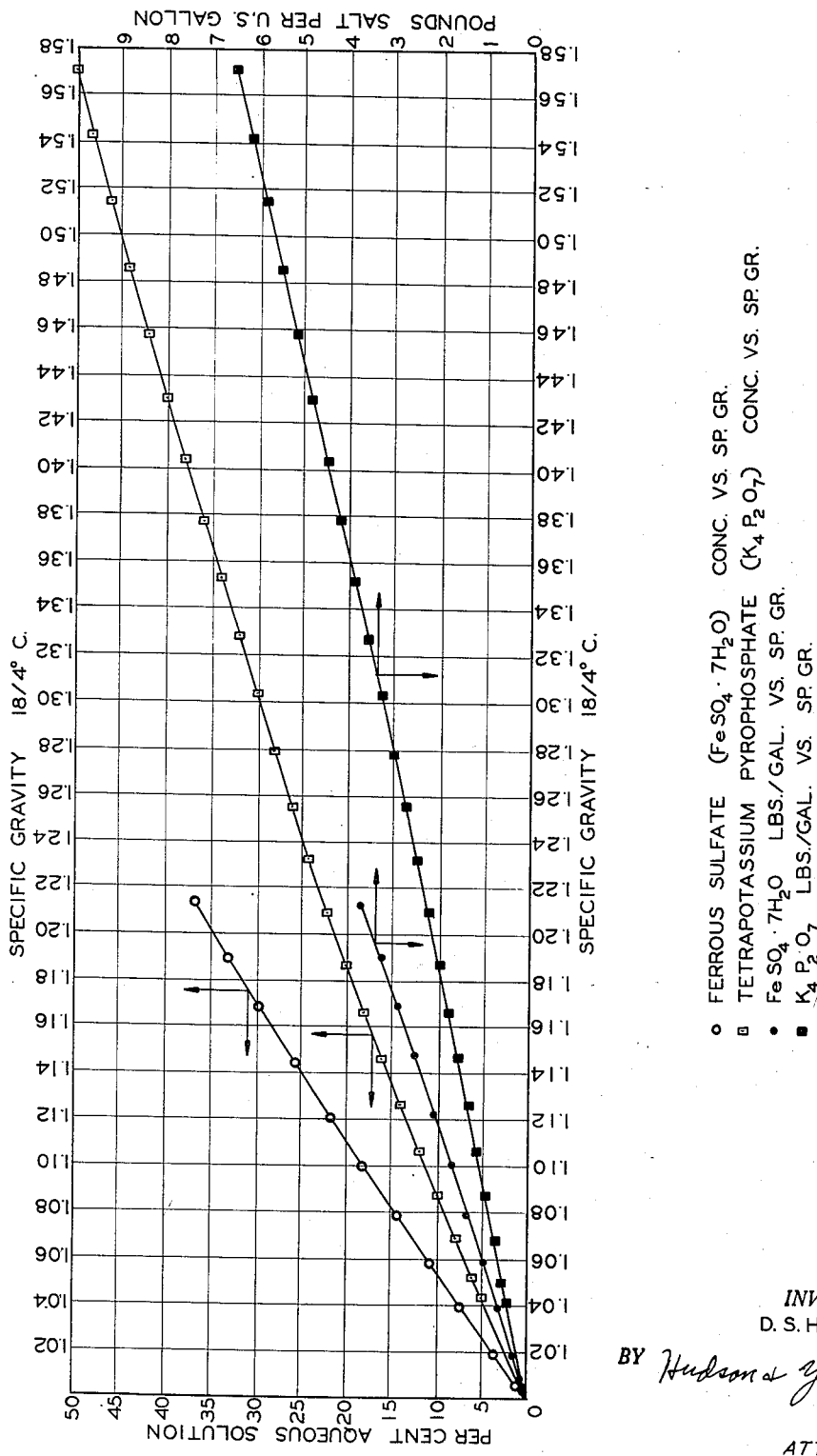

I will further describe this invention by referring to the drawing of which:

Figure 1 is a schematic representation of a preferred embodiment of this invention, and Figure 2 is a graph wherein the specific gravity of an aqueous solution of each of the two salts is plotted against (1) the percent concentration and (2) the pounds of dry salt per U. S. gallon.

Referring to the drawing a solution of potassium pyrophosphate is made up in preparation system 1 and a solution of ferrous sulfate is made up in preparation system 2. The general arrangement of the two systems is the same and for that reason I will use the same numeral for the same parts and will use a prime for system 2. Mixing vessel 3 is equipped with agitator 4. Fluid conduit 5 is connected to vessel 3 through flow control valve 6. A liquid level controller 7 is operably connected to vessel 3 and flow control valve 6 so as to detect the level in vessel 3 and to increase or decrease the opening of valve 6 in response to changes in said level. Solids conveyor 8 opens to solids feeder 9 which is adapted to receive solids from conveyor 8 and to regulate the rate of feed to vessel 3. A density detector 10 is operably installed in vessel 3 and connected to feeder 9 so as to detect the density of a fluid in said vessel 3 and to increase or decrease the feed rate of feeder 9 in response to changes in said density. A fluid conduit 11 adapted to withdraw fluid from vessel 3, passes through flow control valve 13 which is operably connected to flow controller 12. The flow controller 12 is operably installed in conduit 11 to detect the rate of flow and is operably connected to flow control valve 13 so as to increase or decrease the opening therethrough in response to changes in said flow rate. The conduit 11 passes into mixer 14 which is connected by conduit means to heater 15. Heater 15 is connected by conduit means to cooler 16 which is in turn connected by conduit means to a surge tank 17. The surge tank is connected via conduit 18 to the reactor, not shown.

I have referred to the various detectors, controllers, feeders, etc. generically since I am not limited to any particular type of such instruments. However, in the specific apparatus used in obtaining the data of the following example the solids feeder 9 is a Model FM-1-30 "Syntrol" vibrating feeder, the density detector controller 10 is a "Princo" pipe line model "Densitrol." The "Densitrol" is used with a Brown Model 152R134-135-11 "Electronik" potentiometer with an integral electro-line relay type 801D6K-98-30. The rate of flow is controlled by a Fischer and Porter "Flowrator" (flow controller 12). The location of the various pipes, controllers, valves etc. can be changed without departing from the scope of this invention. For example the density detector 10 could be placed in outlet conduit 11.

I will further describe the process of this invention by referring to the drawing in conjunction with a description of the preparation of a ferrous pyrophosphate complex. I will also assume a basic polymerization recipe as follows:

| | Parts by weight |
|---|---|
| Monomer | 100 |
| Water | 200 |
| Rosin acid soap | 2.25 |
| Sodium fatty acid soap | 2.25 |
| Tamol N * | 0.15 |
| KCl | 0.4 |
| Versene Fe-3 ** | .005 |
| NaOH | 0.04 |
| Tert-dodecyl mercaptan | 0.2 |
| Ferrous sulfate heptahydrate | 0.2 |
| $K_4P_2O_7$ | 0.25 |
| Paramenthane hydroperoxide | 0.1 |

* A sodium salt of naphthalene sulfonic acid condensed with formaldehyde.
** A polycarboxylic amino acid.

Now referring to the Figure 1, water passes via conduit 5 and air operated valve 6 to mixing vessel 3 and at the same time potassium pyrophosphate is fed via vibrating feeder 9 to vessel 3. The material is continuously stirred by means of stirrer 4. The solution is made to some predetermined specific gravity (depending upon desired concentration) as detected by means of the controller 10. Now assuming we want a 3 percent aqueous solution of the pyrophosphate, the controller will be set to hold a specific gravity (sp. gr. 18/4C) of 1.024, as can be determined by the Figure 2. Now as long as the sp. gr. is below this value, the controller will cause the feeder 9 to continue to add dry potassium pyrophosphate. When the sp. gr. tends to rise above the desired level, the controller causes the feeder 9 to cut back on the feed. The solution is withdrawn at the desired rate and the liquid level controller maintains the liquid level in vessel 3 by means of valve 6. In the same manner, the ferrous sulfate hydrate solution is prepared.

The graph of Figure 2 can be used to select a desirable concentration and rate of solution feed. For example if 1000 pounds of monomer is being charged per hour, 2 pounds of ferrous sulfate hydrate and 2.5 pounds of potassium pyrophosphate will be required. Now if I make a 3 percent solution of the ferrous sulfate hydrate this solution will have a specific gravity of 1.0146 and contain 0.2 pound of salt per gallon. Since 2 pounds is needed then approximately 10 gallons of solution is required. Now assuming it is desirable to use equal volumes of the two solutions then each gallon of pyrophosphate solution should contain .25 pound per gallon and the specific gravity of the solution should be controlled at 1.024 which is approximately a 3 percent solution.

Now again referring to Figure 1, solution will be withdrawn from the two mixing vessels at an equal rate of 10 gallons per hour and passed through a mixing zone 14 and on to a heating zone 15 where the temperature will be raised to the desired level, generally in the range 50–90° C., causing the two salts to complex. The material then passes to cooling zone 16 where the temperature is lowered to the desired polymerization temperature. From cooling zone 16 the material passes to a surge tank from which it is fed to the polymerization reactors. It will be obvious that the water in the aqueous solutions must be taken into consideration when changing the ingredients to the reactor, that is this water should be subtracted from the 2,000 pounds of water called for by the recipe.

This invention has been described in a preferred embodiment. Those skilled in the art will see many modifications which can be made without departing from the scope of this invention.

I claim:

1. A method of preparing an aqueous solution of a pyrophosphate complex of uniform quality which comprises introducing water to a first solution preparation zone in response to changes in solution level in said zone to maintain said level substantially constant, introducing a water soluble salt of a multivalent metal to said preparation zone in response to changes of solution density in said zone so as to maintain said density substantially constant, introducing water to a second solution preparation zone in response to changes in solution level in said second zone so as to maintain said last level substantially constant, introducing a pyrophosphate salt to said second preparation zone in response to changes of solution density in said second zone so as to maintain said last density substantially constant, withdrawing solution from both of said zones at a predetermined ratio, mixing withdrawn solution, and heating said mixture for a period of time sufficient to cause the pyrophosphate salt and the multivalent metal salt to complex.

2. A method of preparing an aqueous solution of a pyrophosphate complex of uniform quality which comprises continuously detecting the liquid level in a first solution zone, admitting water to said zone in response to changes in said liquid level so as to maintain said level at a predetermined position, continuously detecting the density of liquid in said first solution zone, feeding a pyrophosphate salt to said first zone in response to changes in said density so as to maintain said density at a predetermined value, continuously agitating contents of said first zone to insure solubility of said salt in said liquid and to insure a uniform solution, continuously detecting the liquid level in a second solution zone, admitting water to said second solution zone in response to changes in said liquid level so as to maintain said level at a predetermined position, continuously detecting the density of liquid in said second solution zone, feeding a salt of a multivalent metal to said second zone in response to changes in second said density so as to maintain said last density at a predetermined value, continuously agitating contents of said second zone to insure solubility of second said salt in second said liquid and to insure a uniform solution in second said solution zone, withdrawing solution from each of said solution zones at a predetermined ratio, mixing the withdrawn solutions and heating the resulting mixture to form a complex of the multivalent metal and the pyrophosphate.

3. The process of claim 2 wherein the pyrophosphate salt is selected from the group consisting of alkali metal and ammonium salts of pyrophosphate and the multivalent metal salt is selected from the group consisting of water soluble salts of iron, manganese, copper, vanadium and cobalt.

4. The process of claim 3 wherein the pyrophosphate salt is tetrapotassium pyrophosphate and the multivalent metal salt is ferrous sulfate.

5. The process of claim 3 wherein the pyrophosphate salt is tetrasodium pyrophosphate and the multivalent metal salt is ferric sulfate.

6. An apparatus for preparation of aqueous solution of a salt which comprises in combination a vessel, means for admitting water to said vessel, a power operated valve in said means for admitting water, means for detecting liquid level operably installed in said vessel, means for activating said power operated valve in response to changes in liquid level in said vessel operably connected to said means for detecting liquid level, means for feeding salt to said vessel, means for detecting density of a liquid operably installed in said vessel, means for activating said means for feeding salt in response to changes in liquid density in said vessel operably connected to said density detecting means, means for stirring contents of said first vessel, a second vessel, means for admitting water to said second vessel, a power operated valve in said means for admitting water to said second vessel, means for detecting liquid level operably installed in said second vessel, means for activating said last power operated valve in response to changes in liquid level in said second vessel operably connected to said last means for detecting liquid level, means for feeding salt to said second vessel, means for detecting density of a liquid operably installed in said second vessel, means for activating said last means for feeding salt in response to change in liquid density in said second vessel operably connected to said density detecting means, means for stirring contents of said second vessel, means for withdrawing liquid from each of said vessels at predetermined rates, means for mixing liquid from the said vessels operably connected to outlet of said means for withdrawing liquid, a heating means, a conduit means connecting outlet from said mixing means to inlet of said heating means, and an outlet in said heating means.

7. An apparatus for preparation of aqueous solution of a salt which comprises in combination a vessel, means for admitting liquid to said vessel, a power operated flow control means in said means for admitting liquid, means for detecting liquid level operably installed in said vessel, means for activating said power operated flow control means in response to changes in liquid level in said vessel operably connected to said means for detecting liquid level, means for feeding salt to said vessel, means for detecting density of a liquid operably installed in said vessel, means for activating said means for feeding salt in response to changes in liquid density in said vessel operably connected to said density detecting means, a second vessel, means for admitting liquid to said second vessel, a power operated flow control means in said means for admitting liquid to said second vessel, means for detecting liquid level operably installed in said second vessel, means for activating said last power operated flow control means in response to changes in liquid level in said second vessel operably connected to said last means for detecting liquid level, means for feeding salt to said second vessel, means for detecting density of a liquid operably installed in said second vessel, means for activating said last means for feeding salt in response to change in liquid density in said second vessel operably connected to said density detecting means, means for withdrawing liquid from each of said vessels at predetermined rates, and means for mixing liquid from the said vessels operably connected to outlet of said means for withdrawing liquid.

References Cited in the file of this patent

UNITED STATES PATENTS

| | | |
|---|---|---|
| 1,928,008 | Courthope | Sept. 26, 1933 |
| 1,942,859 | Hickman | Jan. 9, 1934 |
| 2,551,355 | Weiss | May 1, 1951 |
| 2,614,574 | Farrell | Oct. 21, 1952 |